United States Patent

[11] 3,571,704

[72] Inventors Roger W. Carson
 Fredericksburg;
 Helmut A. Schwab, Dahlgren, Va.
[21] Appl. No 827,841
[22] Filed May 26, 1969
[45] Patented Mar. 23, 1971
[73] Assignee the United States of America as represented by the Secretary of the Navy

[54] METHOD FOR DETERMINING THE DEGREE OF HAZARD TO ELECTROEXPLOSIVE DEVICES FROM AN ELECTROMAGNETIC ENVIRONMENT
3 Claims, 3 Drawing Figs.
[52] U.S. Cl. ................................................. 324/72
[51] Int. Cl. ........................................... G01r 31/02
[50] Field of Search ......................................... 324/72, 72.5

[56] References Cited
UNITED STATES PATENTS
3,046,482 7/1962 East ........................... 324/72.5
3,229,274 1/1966 Riley et al. .................. 324/72

OTHER REFERENCES
Near Zone Electric Field-Strength Meter, The Electronics Engineer; Apr 1967, pp.68— 70 (Copy in 324— 72)

Primary Examiner—Rudolph V Rolinec
Assistant Examiner—R J Corcoran
Attorneys—Edgar J. Brower and Thomas O. Watson, Jr.

ABSTRACT: Potential difference between a weapon system and ground when that system is placed in an electromagnetic environment is an indication of degree of hazard to an electroexplosive device carried by the weapon system. The voltage measurement from weapon system to ground was found to be proportionately related to the radio frequency induced currents in the firing circuit of the electroexplosive device within the frequency range of 0—26MHz. Since this induced current can be said to directly indicate hazard of premature detonation to an electroexplosive device, the voltage measurement is an indicator of degree of hazard. By measuring the potential difference of a weapon system against ground in a standard electromagnetic environment and comparing with a measurement made in a working environment, the degree of hazard to the electroexplosive device in the working environment is determined.

PATENTED MAR 23 1971 3,571,704

INVENTORS
ROGER W. CARSON
HELMUT A. SCHWAB

BY Thomas O. Watson Jr.
ATTORNEY 3,571,704

METHOD FOR DETERMINING THE DEGREE OF HAZARD TO ELECTROEXPLOSIVE DEVICES FROM AN ELECTROMAGNETIC ENVIRONMENT

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention is concerned with a method of determining the degree of hazard to an electroexplosive device when encountering an electromagnetic environment and more particularly relates to a method for determining the hazard of premature detonation to a weapon employing an electric firing circuit.

Premature detonation occurs primarily because of radio frequency induced currents generated by the electromagnetic environment within which the electroexplosive device or weapon is located. Prior art methods and devices that are used to indicate the degree of hazard to an electroexplosive device located in a certain electromagnetic environment utilize a far field electromagnetic meter which measures electromagnetic field intensity. A far field meter is capable of measuring the intensity of an electromagnetic field in the radio frequency range by defining the intensity of said field only along the vertical axis. The effect of this electromagnetic field as defined by this measured parameter on an electroexplosive device was then measured by means of thermocouples which detected the heat rise within the electroexplosive device. This method of determining the degree of hazard to an electroexplosive device was found to be highly inflexible and inaccurate. The measurements and determinations had to be made at the work site of the particular weapon system under consideration. Measurements that were not taken at the work site but at another site, a test facility for example, would not accurately indicate the degree of hazard that would actually be present at the work site. The measure of electromagnetic field intensity along a vertical axis at a test facility would not indicate the degree of hazard that the electroexplosive device would encounter at its work site because the field intensity measurement obtained was not proportional to the current induced in the circuit of the electroexplosive device.

SUMMARY OF THE INVENTION

The present invention contemplates the use of a method utilizing a measurable variable which is proportionately related to the current induced in the circuit of an electroexplosive device by the electromagnetic environment in which the electroexplosive device is located. Because this measurable variable is proportionately related to the radio frequency induced current, a valid comparison between various electromagnetic environments at different locations on the basis of degree of hazard to an electroexplosive device located within the respective environment can be made. The method of the present invention thus comprises taking a voltage measurement between ground and the point of contact between a weapon utilizing an electroexplosive device and its carrier, such as an aircraft for example. This voltage measurement characterizes the effect a particular electromagnetic environment is having on the circuit of the electroexplosive device. Therefore by taking a voltage measurement in a standard electromagnetic environment produced at a test facility and comparing this measurement with a measurement taken at a work site, a determination as to whether, and to what degree, hazard of premature detonation to an electroexplosive device exists at the work site.

OBJECT OF THE INVENTION

An object of this invention is to provide a method for accurately determining the hazard from electromagnetic radiation that an electroexplosive device would experience in an electromagnetic environment.

Another object of this invention is to provide a method which will allow a meaningful comparison between a test facility generated electromagnetic environment and a near-field electromagnetic environment generated under working conditions, with respect to degree of hazard to an electroexplosive device.

Other objects, advantages and novel features of the invention will become apparent from the following detailed description of the invention when considered in conjunction with the accompanying drawings.

DESCRIPTION OF THE PREFERRED EMBODIMENT

Figure 1:
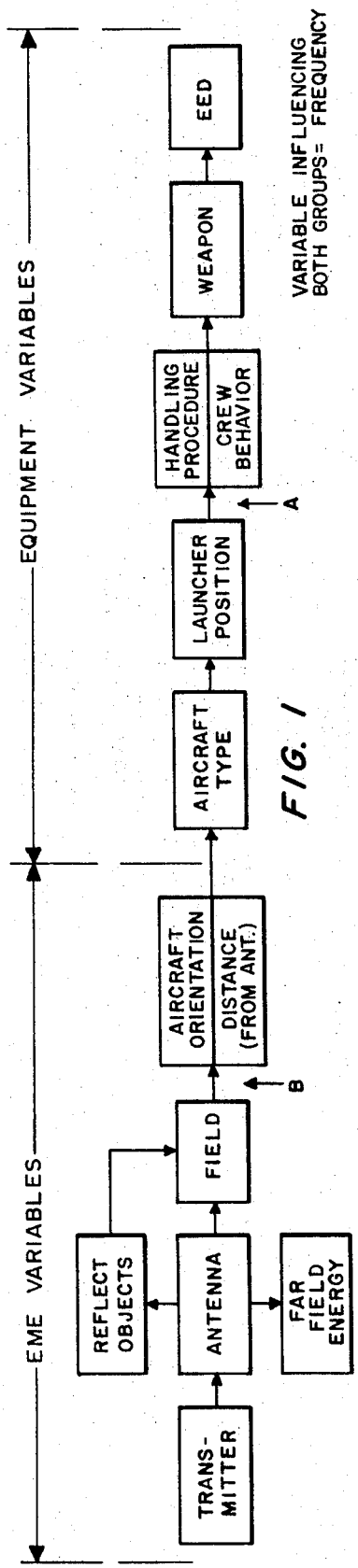
FIG. 1 illustrates in block diagram form the sequence of variables affecting an electroexplosive device in an electromagnetic environment.

With reference to FIG. 1, which indicates the variables that affect the current induced in the circuit of an electroexplosive device, it can readily be determined that in order to get a measured parameter that will be relatively general and yet specific enough to be meaningful in relating the radio frequency induced current to the electromagnetic environment, we must define a measured parameter at point A on the chain of variables affecting the electroexplosive device. A measurement at point A will inherently account for all the variables that have preceded that point on the chain. Thus, only the four variables that follow point A and frequency need to be taken into account. As can be seen from FIG. 1, the measurement of the electromagnetic field at point B of the chain which would completely describe the electromagnetic field intensity at that point would create a very difficult problem of relating induced current to the field intensity since nine variables instead of five have to be taken into consideration and no practical instrumentation for determining the field intensity for near-field conditions is presently available.

Figure 2:
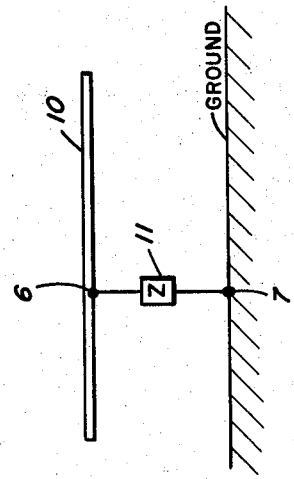
FIG. 2 illustrates a simplified model taking into account the five variables affecting a weapons system in an electromagnetic environment that need be considered in connection with this invention.

Reference is now made to FIG. 2 which illustrates the functional relationship between the five variables under consideration and the measurable parameter that will characterize our electromagnetic environment.

If we represent a weapons system, for example an aircraft, by conductor 10 and consider it as functioning as a receiving antenna, receiving signals from a nearby electromagnetic generator, a voltage gradient or potential difference will be created between antenna 10 and ground, which for example can be the deck of an aircraft carrier. If an impedance 11 were connected between antenna 10 and ground, at points 6 and 7 for example, the voltage or potential difference between antenna 10 and ground would drive a current through impedance 11.

Assuming impedance 11 to represent the complicated network formed by a weapon, handling personnel and an electroexplosive device, the current driven through the impedance would also be the current driven through the circuit of the electroexplosive device. Taking a voltage measurement across the impedance would thus characterize the effect the electromagnetic environment was having on the weapon system in general as represented by conductive antenna 10 and impedance load 11. For the voltage measurement between antenna 10 and ground to be meaningful when relating and comparing voltage measurements taken in different electromagnetic environments, the potential difference between conductor 10 and ground must be proportional to the current flowing through impedance 11 within the frequency range under consideration. A frequency range of 0—26MHz. would take into account most of the possible electromagnetic environments that need be considered.

Figure 3:
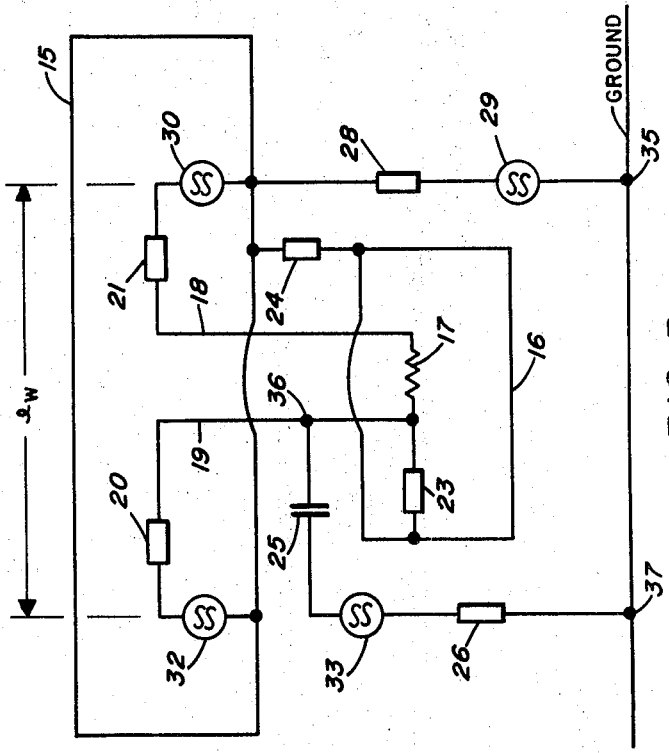
FIG. 3 represents a closely approximated actual model of a weapons system in an electromagnetic environment.

The model of FIG. 2 illustrates in an oversimplified manner the essential relations between the variables under consideration. For the frequency range under consideration, reference must be made to a more complex model, as is illustrated in FIG. 3. An aircraft body 15 is viewed as a receiving antenna. Two wires 18 and 19 connect an electroexplosive device 17 to the aircraft body 15. These two wires are connected to the aircraft through impedances 20 and 21. Either of these impedances may assume any value between zero and infinity; zero representing a good connection and infinity representing an open circuit. The electroexplosive device is connected to the interior of a weapon enclosure 16 through an impedance 23 and the weapon enclosure is electrically connected to the body of the aircraft through an impedance 24. Impedances 23 and 24 may also assume any value between zero and infinity depending on the actual position of the weapon. If the weapon is racked, for example, the impedance 24 would be rather low, the actual value depending on whether the contact points are clean, painted or corroded. Before being racked the weapon is connected to the airplane by a rather high value of impedance 24.

Capacitor 25 and an impedance 26 represent crew reactance. Capacitor 25 may be interpreted as the effective capacitive reactance between the operator's hand and the umbilical cable. Impedance 26 represents body impedance. Impedance 28 represents impedance between aircraft and ground at the launcher position being considered. Voltage generator 29 represents the open circuit voltage at the same point.

This model is not a complete representation of the physical relationships existing in an electromagnetic environment. However, it is adequate for an evaluation of relative intensities of electromagnetic environments with respect to their effect on an electroexplosive device. At low and medium frequencies up to and approximately equal to 10 megacycles per second the description given by the model of FIG. 3 as to the relationship between the variables of a weapons system is fairly accurate. In frequencies above 10 MHz. however, it becomes more complicated since stray capacitances between elements and stray inductances between connections can no longer be discounted. The effectiveness of the model illustrated in FIG. 3 will not be diminished, however, if these stray impedances are relatively small as compared to the impedances represented in the model of FIG. 3.

An additional problem is encountered in the higher frequencies because the length $1w$ over which the weapon system is physically extended is no longer a small enough fraction of the generated wave length. Therefore, it is not possible to conclude that the voltage between the aircraft and ground is at the same amplitude and phase everywhere along the length $1W$. If this is so, then contributions to the current induced in the electroexplosive device come from several points within the circuit of the electroexplosive device. In other words, the length of antenna 15 experiences a variety of potential differences. The equivalent voltage generators 30, 32, and 33 represent the effect of the multitude of voltage variation along the antenna's length.

The current path through the electroexplosive device when such device is located in an electromagnetic environment will be from point 35 on the ground, through voltage generator 29, impedance 28, voltage generator 30, impedance 21, conductor 18, through electroexplosive device 17, to point 36, through capacitor 25, voltage generator 33, impedance 26 and to point 37 on the ground. Since only voltage 29 is measured and current through the electroexplosive device really depends on the circuit voltage 29 and some additional voltages, it cannot, in general, be assumed that current through the electroexplosive device will remain proportional to the open circuit voltage for different electromagnetic environments. In order for output of voltage generator 29 to remain proportional to the current flow through the electroexplosive device, it is necessary that the voltage represented by voltage generator 29 remain the dominant influence in the current path taken.

The only procedure available to verify that voltage 29 is in fact the dominant influence in the current path, is by means of experimentation and statistical analysis. Experimental results compiled after extensive effort over an extended period of time were statistically analyzed and indicated that voltage 29 is proportionally related to the current flow through the electroexplosive device by a constant factor having a determined accuracy. The voltage measurement is therefore, a valid characterization of the effect an electromagnetic environment has on a particular weapons systems.

A weapon system's susceptibility to the electromagnetic radiation present in a weapon's work environment can now be determined by a simple voltage measurement between a weapon system and ground. Voltage measurements between a weapon system and ground can be made with well known voltage measuring instruments. These measurements would be compared with a voltage measurement obtained in an electromagnetic environment created at a test facility which would actually represent the standard degree of hazard presented by the work environment.

The method of determining what degree of hazard is presented by electromagnetic radiation in a weapon system's work environment will now be described. An electromagnetic environment can be created at a shore-based test facility by the use of a whip antenna to generate radio frequencies of the range desired. The power output of this antenna is adjusted to a level which would simulate the maximum radiation intensity a weapon system carrying an electroexplosive device would experience in a work environment. This level of intensity was found to be approximately 100 volts/meter as measured by a standard field intensity meter at a distance of 10 feet from the antenna which produces the test environment. Such an intensity of radiation represents a hazardous condition to an electroexplosive device. A weapon system such as a fighter aircraft is then located 10 feet from the radiating antenna. A voltage measurement between the aircraft and ground is taken at the point of contact between the aircraft and a dummy weapon utilizing an electroexplosive detonating device. This voltage measurement then represents the most hazardous condition to be encountered in a work environment. The same type of voltage measurements are then taken at the work site which usually has a variety of antennas, all generating radio frequency energy at the same time. By comparing these voltage measurements to the standard voltage measurement taken at the work site, an indication of how close the work environment is to a hazardous condition is obtained.

It has been determined by means of extensive experimentation that a voltage indication of one-fiftieth of the standard hazardous measurement obtained at the test facility is a safe environment for HERO Susceptible Ordnance. By comparing measurements obtained in a work environment with one-fiftieth of the measurement obtained at the test facility while simulating a dangerous environment, indication of degree of hazard is obtained.

In this manner various electromagnetic environments may be compared on the basis of degree of hazard they respectively represent to an electroexplosive device.

Obviously, other combinations and methods of comparing the simple voltage measurements obtained so as to determine relative degree of hazards of a certain electromagnetic environment are possible in light of the above teachings.

We claim:

1. A method for determining degree of hazard to electroexplosive devices from an electromagnetic environment generated by nearby electromagnetic frequency radiating equipment comprising the steps of:

establishing a standard near-field electromagnetic environment at a test facility which simulates a hazardous radiation intensity a weapon system could experience in a work environment;

placing a weapon system carrying an electroexplosive device in said standard environment;

measuring potential difference between said weapon system and ground while said system is in said standard environment said voltage representing a hazardous condition in a work environment;

placing said weapon system in its work environment which is permeated with electromagnetic radiation;

measuring potential difference between said system and ground while said system is in said work environment; and comparing the two voltage measurements to determine the degree of hazard to an electroexplosive device carried by said weapon system in said work environment.

2. The method recited in claim 1 further comprising the steps of:

relating the voltage measurement obtained in said work environment to the voltage measurement obtained in said standard environment so as to produce a fractional proportion between said voltages; and indicating degree of hazard to an electroexplosive device in said work environment by means of said fractional proportion.

3. A method for determining degree of hazard to electroexplosive devices from an electromagnetic environment comprising the steps of:

establishing a standard dangerous condition electromagnetic environment at a test facility;

placing a weapon system carrying an electroexplosive device into said environment;

measuring potential difference between said weapon system and ground at the point said electroexplosive device attaches to said weapon, while said system is in said environment said voltage representing a hazardous condition in a work environment;

operating on said measured potential difference by a desired safety factor so as to produce a measure of potential difference considered to be an indication of a safe environment;

measuring potential difference between a weapon system and ground that is located in a work environment which is permeated with electromagnetic radiation;

comparing the measured potential difference in said work environment with said measure of potential difference which indicates a safe environment; and indicating whether the measured potential difference in said work environment is above or below the measured potential difference indicating a safe environment, whereby the degree of hazard to electroexplosive devices in said work environment is determined.